Dec. 22, 1964

P. R. MINGOT 3,162,138

HYDRAULIC GEAR ENGINE, ALSO ADAPTED
FOR USE AS A GEAR PUMP

Filed April 29, 1963

4 Sheets-Sheet 1

Dec. 22, 1964 P. R. MINGOT 3,162,138
HYDRAULIC GEAR ENGINE, ALSO ADAPTED
FOR USE AS A GEAR PUMP
Filed April 29, 1963 4 Sheets-Sheet 2

Dec. 22, 1964 P. R. MINGOT 3,162,138
HYDRAULIC GEAR ENGINE, ALSO ADAPTED
FOR USE AS A GEAR PUMP
Filed April 29, 1963 4 Sheets-Sheet 4

United States Patent Office 3,162,138
Patented Dec. 22, 1964

3,162,138
HYDRAULIC GEAR ENGINE, ALSO ADAPTED FOR USE AS A GEAR PUMP
Pierre Robert Mingot, Morges, Switzerland, assignor to Prematex S.A., Morges, Switzerland, a firm
Filed Apr. 29, 1963, Ser. No. 276,332
Claims priority, application Switzerland, May 4, 1962, 5,405/62
4 Claims. (Cl. 103—126)

Hydraulic gear engines are already known in which the gear journals have a smaller diameter than the pitch circle of the gears.

Consequently, the working pressures at which an engine of this type can be operated and therefore also the power supplied are limited. These small journal diameters in fact, permit the application and maintenance of only relatively low pressures of the driving fluid.

The object of the invention is to obviate this disadvantage and to provide a hydraulic gear engine which can also be utilised as a gear pump and which can be operated with good efficiency even at high pressures.

The invention is characterised in that the outside diameter of the gear journals is equal to the outside diameter of the gears.

In the engine according to the invention the pressure is maintained in exactly the same manner as in a volumetric piston engine; as compared with a piston engine, however, the advantage is gained that there are no reciprocating parts but only continuously rotating parts. Since in addition no axial forces act on the gears, the engine according to the invention can be of very simple construction.

In order in addition to avoid to a great extent the deformations of engine parts which occur under the action of high pressure, according to another principle of the invention provision is made to surround the engine casing by an independent fastening ring in which there are provided on two diametrically opposite sides pistons of suitable dimensions by which one chamber is formed in the inlet and one in the outlet passage for the pressure medium and by means of which the forces acting under the pressure occurring in one chamber or the other are locally transmitted to a region in which they act in the opposite direction.

Figure 1:
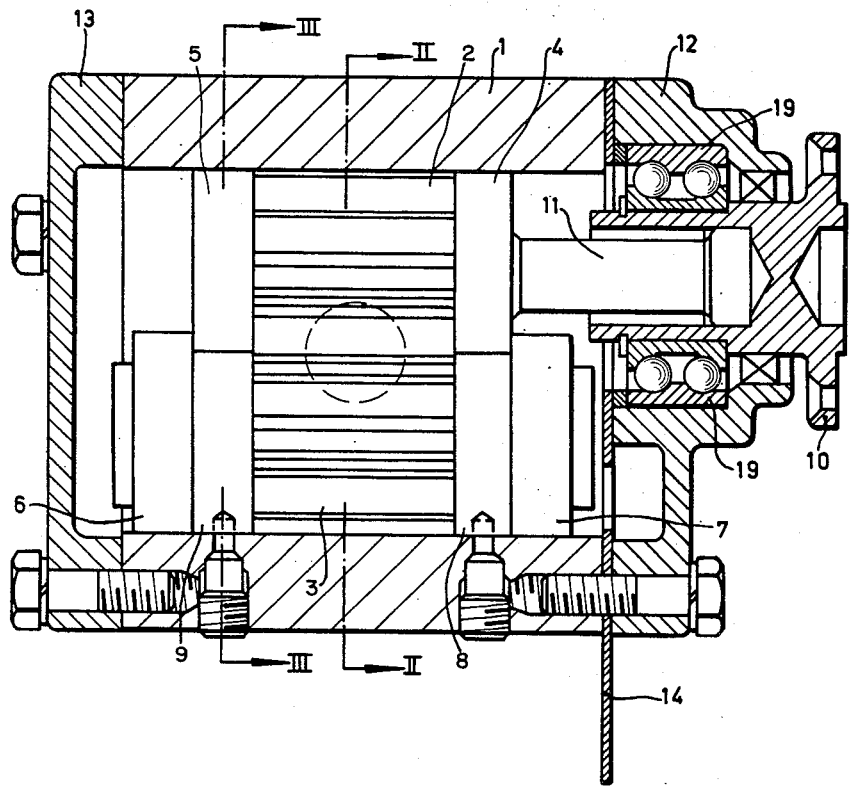
Figure 2:
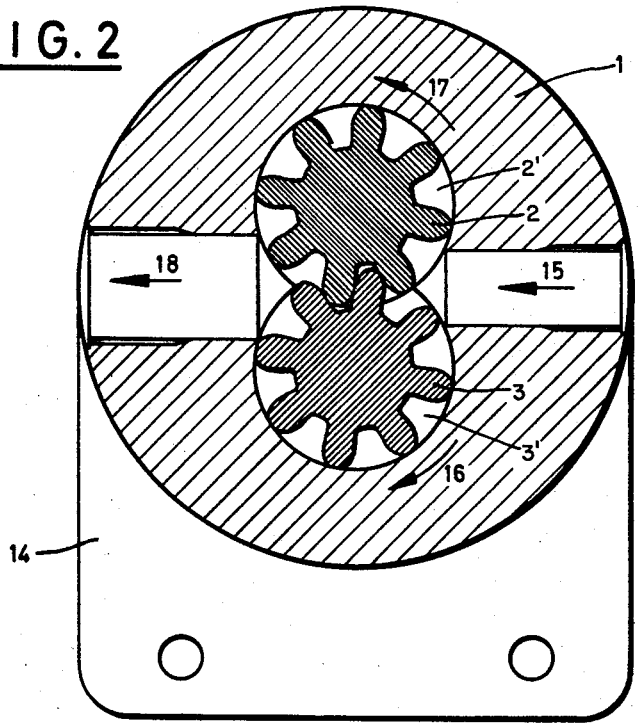
Figure 3:
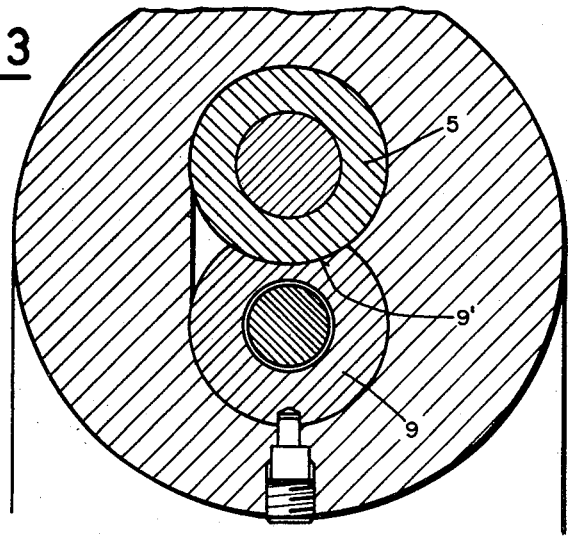
Figure 4:
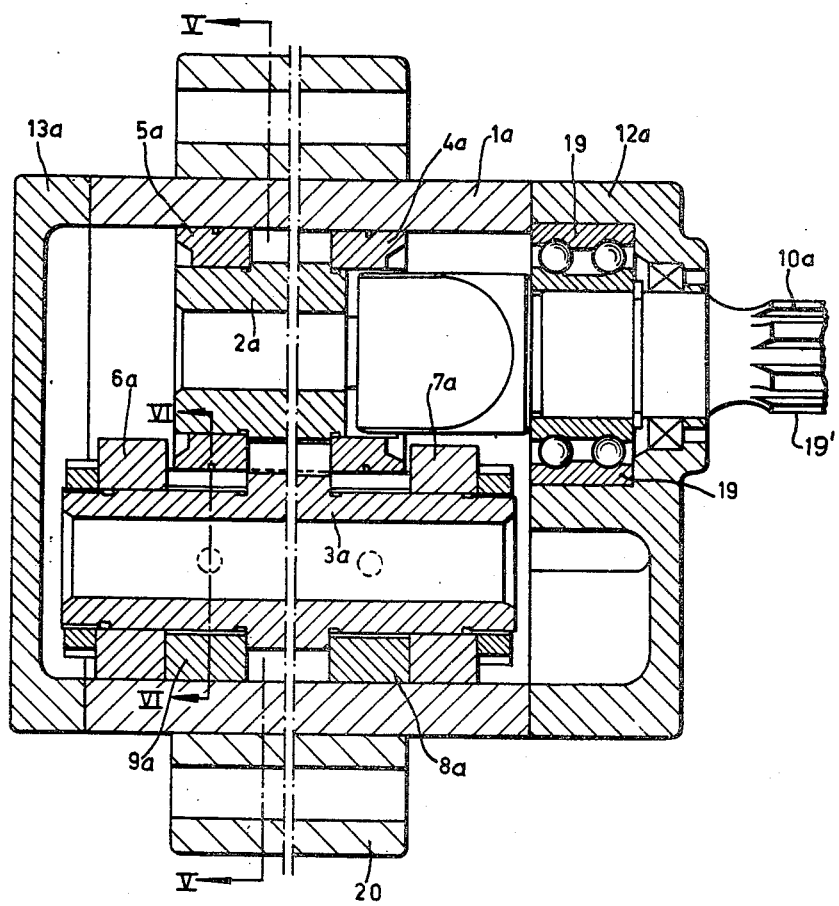
Figure 5:
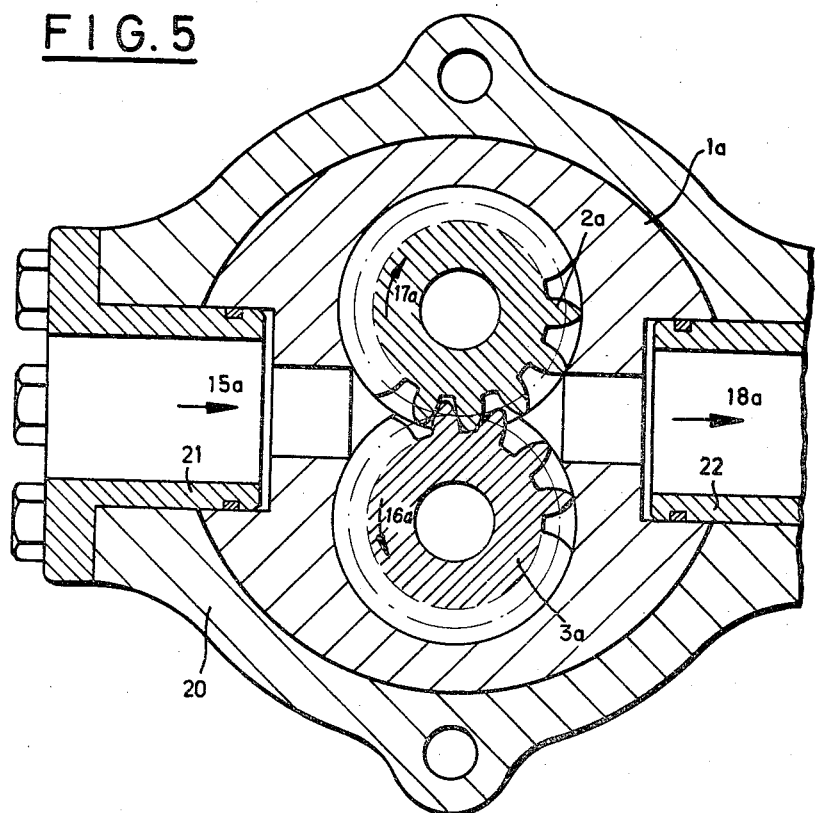
Figure 6:
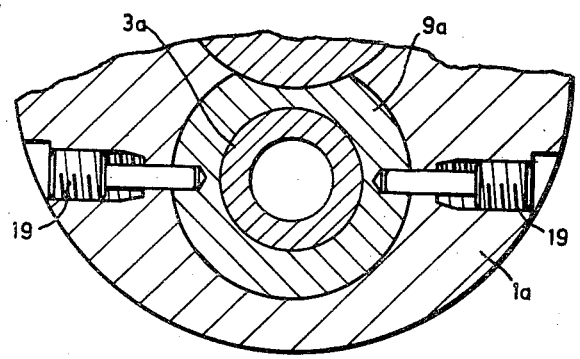

Two embodiments of the invention are described more fully below as examples with reference to the accompanying drawings, in which:

FIGURE 1 shows a longitudinal section through the first embodiment,

FIGURE 2, a section along the line II—II in FIGURE 1,

FIGURE 3, a section along the line III—III in FIGURE 1,

FIGURE 4, a longitudinal section through the second embodiment,

FIGURE 5, a section along the line V—V in FIGURE 4, and,

FIGURE 6, a partial section along the line VI—VI in FIGURE 4.

As illustrated in FIGURES 1 to 3, the first embodiment of an engine according to the invention has a casing 1 having two parallel cylindrical bores 2′ and 3′. These bores contain the two gears 2 and 3 meshing with one another; the axes of these gears coincide with the axes of the cylindrical bores, which overlap within a small sector corresponding to the range of engagement of the two gears. Each of the two terminal portions of the two gears 2 and 3 on both sides of the teeth is constructed as a journal 4, 5 and 6, 7 respectively rotating with the respective gear and according to the invention has the same outside diameter as the gears. For this purpose the journals 4 and 5 of the gear 2 are axially offset in relation to the journals 6 and 7 of the gear 3 (FIGURE 1). In the embodiment considered these journals consist of discs of corresponding diameter which are fastened on the gear shafts. The internal walls of the cylindrical bores 2′ and 3′ at the same time form the bearing surfaces for these journals.

Between the teeth of the gear 3 and each of the respective journals 6 and 7, two rings 9 and 8 respectively are mounted on the shaft of the gear 3 and joined fast to the casing 1, said rings having on their peripheral side facing the gear 2 a recess adapted to the periphery of the bore 2′; in FIGURE 3 the recess 9′ of the ring 9 can be seen. These recesses continuously supplement the inside walls of the cylindrical bore 3′ and hence the bearing for the gear 2 within the axial regions of the bearings 4 and 5, and in this manner, in conjunction with said journals 4 and 5, form the side walls of a fluid-tight space in which the teeth of the two gearwheels 2 and 3 are enclosed.

The casing 1 is closed on both end faces by means of the covers 12 and 13. One end 11 of the shaft of the gear 2 projects outwards through one cover 12. On this shaft end 11, which is preferably grooved, a coupling sleeve 10 is fastened which is rotatably mounted in ball bearings 19 in the cover 12. This coupling sleeve 10 is driven by the gear 2 and delivers the output torque. The member to be driven by the engine is connected to said coupling sleeve 10.

In FIGURE 1, 14 designates a fastening plate which serves to mount the engine.

The engine described works as follows:

Through the inlet aperture 15 (FIGURE 2) which connects the cylindrical outer periphery of the casing 1 to the inner space occupied by the gears, the pressure medium is forced into the engine; under the action of this hydraulic pressure the two gears 2 and 3 are rotated in the direction of the arrows 16 and 17 in FIGURE 2. The pressure medium leaving the gaps between the teeth of the gears passes into the outlet passage 18, which on the side lying opposite to the inlet aperture connects the interior space of the engine to the exterior space, and is discharged through said passage. As already mentioned, the mechanical torque is delivered at the coupling sleeve 10.

If, on the other hand, the coupling sleeve 10 and hence the gear 2 is rotated by any type of motor, the apparatus described acts as a liquid pump, since when the gear 2 is rotated in the direction of the arrow 17 in FIGURE 2 the liquid is sucked through the passage 15 and ejected through the passage 18. If the direction of rotation of the gear 2 is reversed, the flow of liquid delivered by the pump is naturally in the opposite direction.

The second embodiment, illustrated in FIGURES 4 to 6, has similar constructional parts to the first embodiment, and these constructional parts are designated by the same reference numerals as the equivalent parts in FIGURES 1 to 3 with the addition of "a". The two gears 2a and 3a are disposed in two parallel cylindrical bores in the casing 1a; the journals of these gears are formed by the discs 4a and 5a on the gear 2a and by the discs 6a and 7a on the gear 3a. The inside wall of the cylindrical bore for the gear 2a is once again supplemented by two rings 8a and 9a which are joined fast to the casing 1a and which on their side facing the gear 2a have a correspondingly rounded recess. As illustrated in FIGURE 6, the ring 9a is for example joined fast to the casing 1a by means of screws 19. The shaft of the gear 2a is freely rotatable in the middle aperture of the rings 8a and 9a. An output shaft 10a coaxial with the gear 2a is rotatably mounted in the cover 12a with the aid of the ball bearings 19 and at its outer end is provided with splines 19′ through which the output torque is delivered. The inner end of the output shaft 10a is connected to the adjacent end of the shaft of gear 2a by a diametrical blade at the end of one shaft fitting into a diametrical slot in the other. On the other side the casing is closed by the cover 13a.

In contrast to the first embodiment, the casing 1a is in this case surrounded by an independent fastening ring 20 in which the two pistons 21 and 22 are disposed on two diametrally opposite sides. These pistons 21 and 22 form two chambers 15a and 18a respectively in the inlet and outlet paths respectively of the pressure medium. When the pressure medium is forced into the engine through the chamber 15a in the direction of the arrow shown in FIGURE 5, it rotates the two gears 2a and 3a in the direction of the two arrows 16a and 17a and leaves the engine through the outlet chamber 18a. According to the invention the piston 21 here serves the purpose of locally transmitting the forces applied to the gearwheels through the incoming pressure medium to a region in which these forces act in the opposite direction, so that unilateral forces on the gears are avoided. Under the pressure in the chamber 15a the piston 21 transmits by means of the fastening ring 20 a force which is equal to the force acting on the gears but is oppositely directed thereto to the region which encloses the piston 22 and which would otherwise be sensitive to the action of a unilateral force. In the reverse case, when the pressure medium is introduced through the chamber 18a, and a high pressure is therefore built up in that chamber, the piston 22 correspondingly transmits to the region around the piston 21 a force oppositely directed to the loading of the gears.

Depending on the desired direction of rotation of the output shaft 10a, the pressure medium will therefore be introduced either through the chamber 15a or through the chamber 18a, so that the two gears 2a and 3a rotate either in the direction of the arrows 16a and 17a or in the opposite direction thereto.

As in the first embodiment, the apparatus described can also be used as a pump if the shaft 10a is driven in any manner. Depending on the direction of rotation of the shaft 10a, the liquid is either sucked through the chamber 15a and ejected through the chamber 18a, or vice versa.

What I claim is:

1. A hydraulic machine usable alternatively as a gear pump or a gear motor, comprising a casing defining a gear chamber, two gears rotatable in said chamber and intermeshing with one another, an inlet opening into said chamber in front of the zone of intermeshing of said gears and an outlet opening from said chamber on the opposite side of said zone, cylindrical journals at opposite ends of each of said gears and rotatable respectively therewith, said journals having an outside diameter equal to the outside diameter of the gears and the journals of one gear being offset in an axial direction relative to the journals of the other gear with an end face of each journal of one gear overlapping an adjacent end face of a corresponding journal of the other gear, said axial offset resulting in one of the journals at each end of the gears being axially spaced from its respective gear and connected therewith by a shaft portion having a diameter not exceeding the root diameter of the gear, a stationary cylindrical ring surrounding each said shaft portion and filling the space between said spaced journal and the respective gear, said ring having an arcuate recess receiving and fitting the overlapping portion of the adjacent journal of the other gear and an input-output shaft connected with one of said gears and extending to the exterior of said casing.

2. A hydraulic machine according to claim 1, characterized in that said casing is surrounded by an independent fastening ring in which there are disposed on two diametrally opposite sides pistons of suitable dimensions by which one chamber is formed in the inlet and one in the outlet path for the pressure medium and by which the forces acting under the pressure occurring in one chamber or the other are transmitted locally to a region in which they act in the opposite direction.

3. A hydraulic machine usable alternatively as a gear pump or a gear motor, comprising a casing defining a gear chamber, two gears rotatable in said chamber and intermeshing with one another, inlet and outlet openings in said casing on opposite sides of the zone of intermeshing of said gears, cylindrical journals at opposite ends of each of said gears and rotatable respectively therewith in said casing, said journals having an outside diameter equal to the outside diameter of the gears, the journals of a first one of said gears being adjacent the ends of said gear and the journals of the second of said gears being spaced from the ends of said second gear by a distance equal to the axial length of the journals of said first gear and being connected with said second gear by shaft portions having a diameter not exceeding the root diameter of said second gear, a stationary ring surrounding each of said shaft portions and substantially filling the space between the ends of said second gear and the journals of said second gear, each of said rings having in its periphery an arcuate recess closely receiving a portion of the corresponding journal of the first gear which overlaps the respective journal of said second gear, and an input-output shaft connected with one of said gears and extending to the exterior of the casing.

4. A hydraulic machine according to claim 3, in which said casing is substantially cylindrical and is provided at diametrically opposite sides with cylindrical recesses associated respectively with said inlet and outlet openings and in which an equalizing ring surrounds said casing and carries pistons slidably fitting respectively into said cylindrical recesses.

References Cited by the Examiner

UNITED STATES PATENTS

| 1,595,982 | 8/26 | Appel | 103—126 |
| 1,880,108 | 9/32 | Ross | 103—126 |
| 2,221,412 | 11/40 | Rose | 103—126 |
| 2,236,980 | 4/41 | Ungar | 103—126 |
| 2,319,374 | 5/43 | Ungar | 103—126 |
| 2,759,426 | 8/56 | Blomgren et al. | 103—126 |
| 3,056,355 | 10/62 | Brun | 103—126 |

FOREIGN PATENTS

| 450,436 | 10/27 | Germany. |
| 963,749 | 5/57 | Germany. |
| 5,026 | 1907 | Great Britain. |
| 370,214 | 4/32 | Great Britain. |

JOSEPH H. BRANSON, Jr., *Primary Examiner.*

WILBUR J. GOODLIN, *Examiner.*